United States Patent
Lee et al.

(10) Patent No.: US 8,249,398 B2
(45) Date of Patent: Aug. 21, 2012

(54) IMAGE RETRIEVAL SYSTEM AND METHOD

(75) Inventors: Chung-I Lee, Taipei Hsien (TW);
Chien-Fa Yeh, Taipei Hsien (TW);
Wei-Qing Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 235 days.

(21) Appl. No.: 12/635,849

(22) Filed: Dec. 11, 2009

(65) Prior Publication Data
US 2010/0177967 A1 Jul. 15, 2010

(30) Foreign Application Priority Data
Jan. 12, 2009 (CN) .......................... 2009 1 0300147

(51) Int. Cl.
*G06K 9/34* (2006.01)
*G06K 9/40* (2006.01)
*G06K 9/32* (2006.01)
*G06K 9/60* (2006.01)

(52) U.S. Cl. ......... 382/305; 382/164; 382/294; 382/266

(58) Field of Classification Search .................. 382/128, 382/181, 190, 219, 278, 282; 707/769, 752
See application file for complete search history.

(56) References Cited

U.S. PATENT DOCUMENTS

| | | | | |
|---|---|---|---|---|
| 6,594,386 | B1 * | 7/2003 | Golshani et al. | 382/166 |
| 6,801,657 | B1 * | 10/2004 | Cieplinski | 382/164 |
| 7,421,125 | B1 * | 9/2008 | Rees | 382/181 |
| 7,616,793 | B2 * | 11/2009 | Marshall et al. | 382/128 |
| 7,657,100 | B2 * | 2/2010 | Gokturk et al. | 382/209 |
| 7,660,468 | B2 * | 2/2010 | Gokturk et al. | 382/224 |
| 7,840,076 | B2 * | 11/2010 | Bouguet et al. | 382/224 |
| 8,082,263 | B2 * | 12/2011 | Ma et al. | 707/758 |
| 2002/0178057 | A1 * | 11/2002 | Bertram et al. | 705/14 |
| 2003/0072488 | A1 * | 4/2003 | Barsness et al. | 382/181 |
| 2006/0147099 | A1 * | 7/2006 | Marshall et al. | 382/128 |
| 2011/0200260 | A1 * | 8/2011 | Chin et al. | 382/218 |

FOREIGN PATENT DOCUMENTS
| | | |
|---|---|---|
| CN | 101038674 A | 9/2007 |
| CN | 101231662 A | 7/2008 |

* cited by examiner

*Primary Examiner* — Andrae S Allison
(74) *Attorney, Agent, or Firm* — Altis Law Group, Inc.

(57) ABSTRACT

An image retrieval method applies an application server, one or more calculating servers, and a sorting server to perform image retrieval. The application server extracts visual features of an exemplary image. The one or more calculating servers calculate similarities of available images according to the visual features of the exemplary image. The sorting server sorts the available images according to the similarities so as to obtain images similar to the exemplary image.

9 Claims, 3 Drawing Sheets

IMAGE RETRIEVAL SYSTEM AND METHOD

BACKGROUND

1. Technical Field

Embodiments of the present disclosure relate to information retrieval, and particularly to an image retrieval system and method.

2. Description of Related Art

With the rapid development of multimedia technology and computer networks, digital images are widespread. Presently, popular search engines, such as Google, Yahoo, and MSN, provide an image retrieval function for searching images of interest. Most image retrievals add metadata, such as captions, keywords and/or descriptions to the images, and search the images according to the metadata. Such image retrieval is referred to as text-based image retrieval. However, if images similar to an exemplary image are required to be found from an image database, the text-based image retrieval cannot fulfill the image search task. In addition, most image related applications require much computation. Therefore, it may take a long time to implement the image retrieval.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
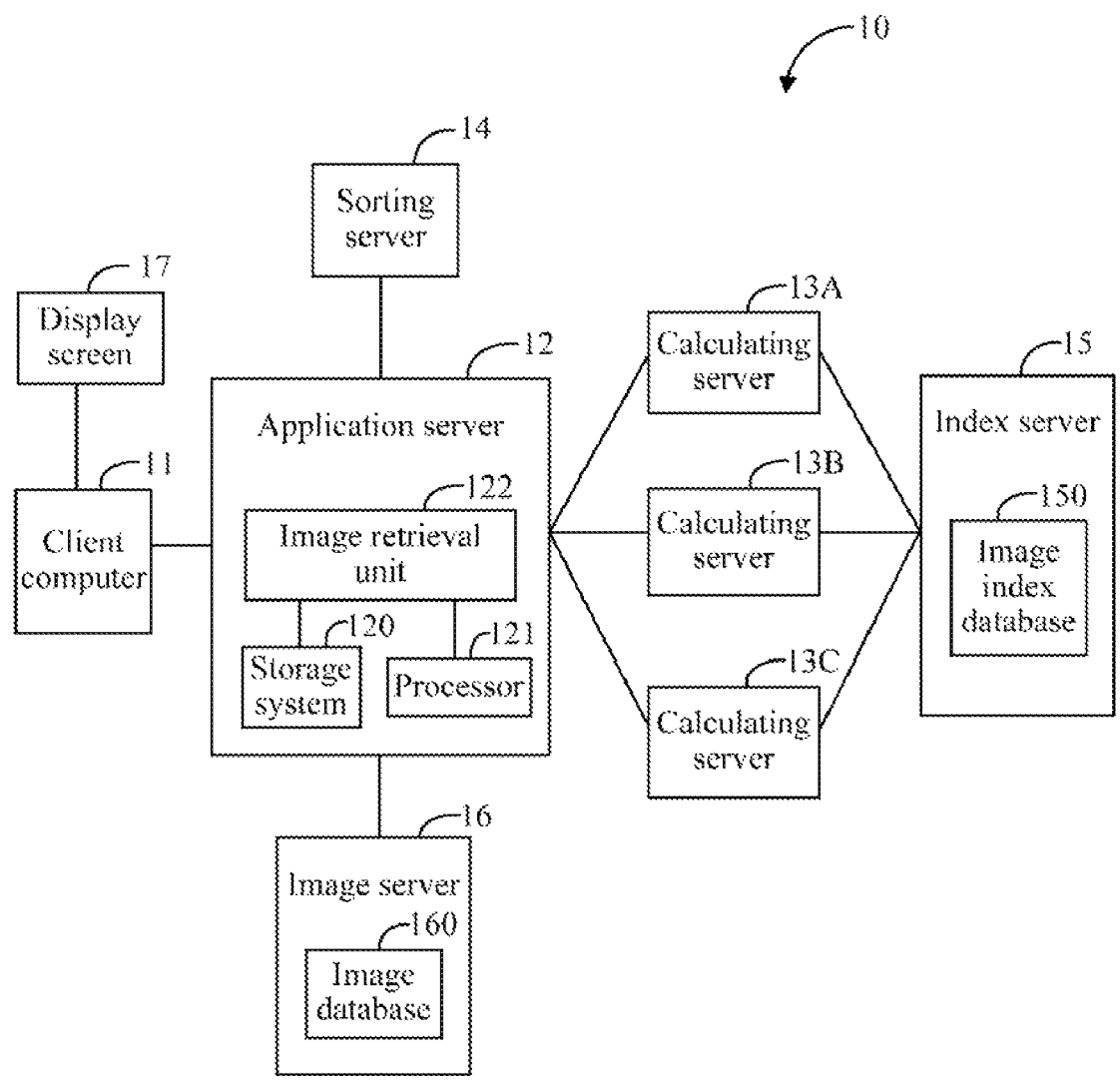
FIG. 1 is a block diagram of one embodiment of an image retrieval system.

FIG. 1 is a block diagram of one embodiment of an image retrieval system 10. The image retrieval system 10 may be used to quickly search images similar to an exemplary image from available images. The image retrieval system 10 may include at least one client computer 11 (only one shown in FIG. 1), an application server 12, calculating servers 13A-13C, a sorting server 14, an index server 15, and an image server 16. The application server 12 is connected to the client computer 11, the calculating servers 13A-13C, the sorting server 14, and the image server 16. The calculating servers 13A-13C are further connected to the index server 15. The client computer 11 may be connected to a display screen 17.

The image server 16 may include an image database 160 that stores the available images. The index server 15 may include an image index database 150 that stores image indexes of the available images. The available images can be fetched from the image database 160 according to image indexes of the available images. In one embodiment, the image indexes include image locations in the image server 16, metadata, and visual features of the available images. The metadata may include captions, keywords, and/or descriptions of the available images. The visual features may include color features and shape features. In one example, the available images are patent images. Metadata of each patent image may include a patent name, an inventor name, a patent number, an application number, an application date, an issue date, and an international classification. Format of the images may include, but are not limited to PDF, JPG, GIF, TIFF, for example.

The client computer 11 provides a user interface to receive an exemplary image and transfer the exemplary image to the application server 12. Furthermore, the client computer 11 receives a search result from the application server 12 and displays the search result on the display screen 17.

Figure 2:
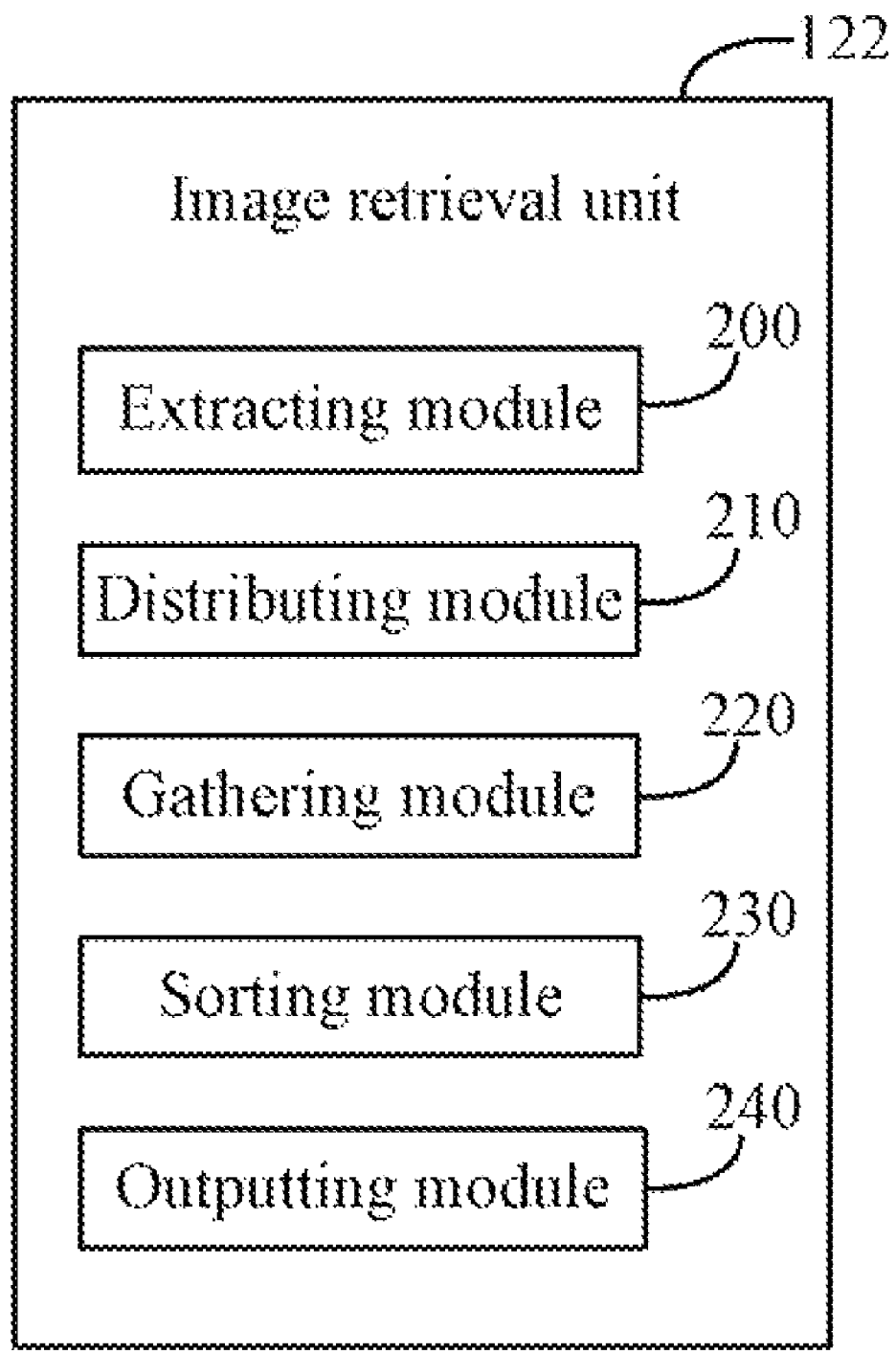
FIG. 2 is a block diagram of one embodiment of an image retrieving unit of an application server in FIG. 1 comprising function modules.

The application server 12 may include a storage system 120, at least one processor 121, and an image retrieving unit 122. One or more computerized codes of the image retrieving unit 122 is stored in the storage system 12 and executed by the at least one processor 13. In one embodiment with respect to FIG. 2, the image retrieving unit 122 includes an extracting module 200, a distributing module 210, a gathering module 220, a sorting module 130, and an outputting module 240.

The extracting module 200 is operable to extract visual features of the exemplary image and transfers the visual features to the calculating servers 13A-13C. The visual features of the exemplary image may include color features, such as an arithmetic mean of pixel values of the exemplary image. The visual features of the exemplary image may further include shape features, such as an outline of the exemplary image.

The distributing module 210 is operable to allocate image comparison tasks to the calculating servers 13A-13C. In one embodiment, the distributing module 210 equally allocates the image comparison tasks. For example, each of the calculating servers 13A-13C is allocated an image comparison task of 1000 exclusive available images. The calculating servers 13A-13C calculate a similarity of each of the allocated available images according to the visual features of the exemplary image and the visual features of the allocated available image. The calculating servers 13A-13C fetch image indexes of each of the allocated available images from the index server 15. Additionally, the calculating servers 13A-13C transfer the similarities and the image indexes of the allocated available images to the application server 12. A similarity of an available image indicates a similar degree between the available image and the exemplary image.

The gathering module 220 is operable to gather the similarities and the image indexes of all the available images from the calculating servers 13A-13C.

The sorting module 230 is operable to transfer the gathered similarities of the available images to the sorting server 14, and send a sorting command to the sorting server 14. In response to the sorting command, the sorting server 14 sorts the available images according to the gathered similarities of the available images, and returns a sorting sequence of the available images to the application server 12.

The outputting module 240 is operable to receive the sorting sequence of the available images from the sorting server 14, and output the image indexes of the available images in the sorting sequence to the client computer 11. In one embodiment, the outputting module 240 outputs a specified amount of the image indexes of the available images to the client computer 11.

Figure 3:
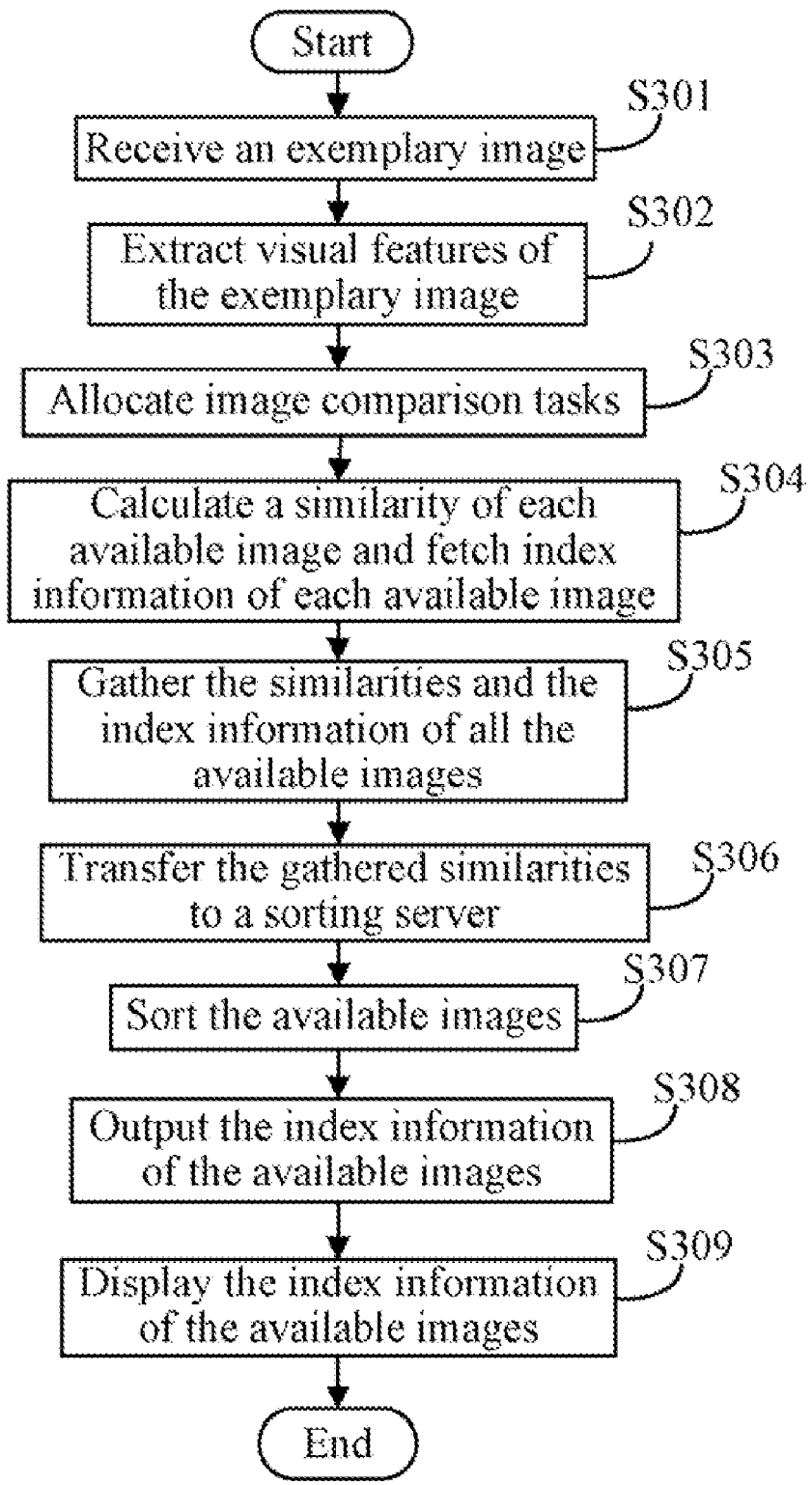
FIG. 3 is a flowchart of one embodiment of an image retrieval method.

FIG. 3 is a flowchart of one embodiment of an image retrieval method. The image retrieval method can quickly search images similar to an exemplary image. Depending on the embodiments, additional blocks may be added, others removed, and the ordering of the blocks may be changed.

In block S301, the client computer 11 receives the exemplary image and transfers the exemplary image to the application server 12. In one embodiment, the client computer 11 provides a user interface to receive the exemplary image.

In block S302, the extracting module 200 extracts visual features of the exemplary image and transfers the visual features to the calculating servers 13A-13C. The visual features of the exemplary image may include color features and shape features. In one example, the extracting module 200 extracts color features of the exemplary image if a color search mode is specified. In another example, the extracting module 200 extracts shape features if a shape search mode is specified.

In one embodiment, the extracting module 200 divides the exemplary image into a plurality of image blocks and extract visual features of the image blocks. Overall visual features of the exemplary image may be determined according to the visual features of the image blocks. In one example, the exemplary image is a gray image and equally divided into 256 image blocks. The extracting module 200 may calculate an arithmetic mean of gray values of pixels in each image block as color features of the image block. The extracting module 200 integrates the color features of the 256 image blocks to obtain overall color features of the gray exemplary image. In another example, the extracting module 200 may transform the gray exemplary image into a black-and-white exemplary image and divide the black-and-white exemplary image into 256 image blocks. A ratio of a black pixel amount to a total pixel amount in the image block may be calculated as shape features of the image block. The extracting module 200 integrates the shape features of the 256 image blocks to obtain overall shape features of the gray exemplary image. If the exemplary image is a color image, the extracting module 200 may transform the color exemplary image into a gray image and extract visual features from the gray image.

It may be understood that the visual features of the available images may be predetermined using a same method as the exemplary image. In one embodiment, each of the available images is divided into a same amount of image blocks as the exemplary image. The visual features of the available image are obtained by integrating visual features of each image block of the available image.

In block S303, the distributing module 210 allocates image comparison tasks of the available images to the calculating servers 13A-13C. In one embodiment, the distributing module 210 equally allocates the image comparison tasks. In one example, there are 3000 available images. The distributing module 210 may allocate an image comparison task of 1000 exclusive available images to each of the calculating servers 13A-13C.

In block S304, the calculating servers 13A-13C calculate a similarity of each of the allocated available images according to the visual features of the exemplary image and the visual features of the allocated available image. Furthermore, the calculating servers 13A-13C fetch image indexes of each of the allocated available images from the index server 15, and transfer the similarity and the image indexes of the allocated available images to the application server 12. The image indexes of the available images may include image locations, visual features, and metadata.

As mentioned above, the visual features of the exemplary image and the available images may be divided into a same amount of image blocks. The calculating servers 13A-13C may calculate a similarity of each image block of an available image, and calculates an overall similarity of the available image according to the similarities of the image blocks. In one example, the calculating module 13A-13C may calculate an arithmetic mean of the similarities of the image blocks as the overall similarity of the available image.

The similarity of an image block of the available image may be determined according to a difference between the image block of the image and a corresponding image block of the exemplary image. For example, gray values of the exemplary image and an available image are 0-255, an arithmetic mean of an image block of the available image is 100, and an arithmetic mean of a corresponding image block of the exemplary image is 110. Thus, a similarity of the image block of the available image may be determined as |110-100|/255.

In block S305, the gathering module 220 gathers the similarities and the image indexes of all the available images from the calculating servers 13A-13C. In one example, each of the calculating servers 13A-13C performs an image comparison task of 1000 available images, and returns similarities and image indexes of the 1000 available images. The gathering module 220 gathers all the similarities and image indexes, so as to obtain similarities and image indexes of the 3000 available images.

In block S306, the sorting module 230 transfers the gathered similarities of the available images to the sorting server 14, and sends a sorting command to the sorting server 14.

In block S307, the sorting server 14 sorts the available images according to the similarity of each of the available images, and returns a sorting sequence of the available images to the application server 12. The sorting server 14 may sort the available images using a sorting algorithm, such as bubble sort, insertion sort, and merge sort. In one example, the sorting server 14 uses a bubble sort algorithm to sort the 3000 available images in an ascending order according to the similarities.

In block S308, the outputting module 240 receives the sorting sequence of the available images from the sorting server 14. The outputting module 240 outputs the image indexes of the available images in the sorting sequence to the client computer 11. In one embodiment, the outputting module 240 outputs a specified amount of image indexes of the available images to the client computer 11. For example, the outputting module 230 sends top 100 image indexes of the available images to the client computer 11.

In block S309, the client computer 11 displays the image indexes of the available images in the sorting sequence on the display screen 17. Therefore, an available image in a former order may be more similar to the exemplary image. In one embodiment, if an available image is user-selected, the application server may fetch the available image from the image database 160.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An image retrieval system for searching images similar to an exemplary image from available images, the image retrieval system comprising:

an extracting module operable to extract visual features of the exemplary image and transfer the visual features of the exemplary image to one or more calculating servers, wherein the visual features of the exemplary image comprise color features and shape features, and wherein the visual features of the exemplary image are extracted by dividing the exemplary image into a plurality of image blocks, calculating an arithmetic mean of gray values of pixels in each image block as the color features of the image block, calculating a ratio of a black pixel amount to a total pixel amount in the image block as the shape features of the image block, and determining overall visual features of the exemplary image according to the color features and the shape features of the image blocks;

a distributing module operable to allocate image comparison tasks of the available images to the one or more calculating servers, such that the one or more calculating servers calculate similarities of the available images according to the visual features of the exemplary image and predetermined visual features of the available images, fetch image indexes of the available images from an index server, and return the similarities and the image indexes of the available images to the image retrieval system;

a gathering module operable to gather the similarities and the image indexes of all the available images from the one or more calculating servers;

a sorting module operable to transfer the gathered similarities of the available images to a sorting server, such that the sorting server sorts the available images according to the gathered similarities of the available images; and an outputting module operable to receive a sorting sequence of the available images from the sorting server, and output the image indexes of the available images in the sorting sequence to a client computer.

2. The image retrieval system of claim 1, wherein the distributing module equally allocates the image comparison tasks.

3. The image retrieval system of claim 1, wherein the outputting module outputs a specified amount of the image indexes of the available images.

4. An image retrieval method for searching images similar to an exemplary image from available images, the image retrieval method comprising:

extracting visual features of the exemplary image and transferring the visual features of the exemplary image to one or more calculating servers, wherein the visual features of the exemplary image comprise color features and shape features, and wherein the extracting step comprises steps of dividing the exemplary image into a plurality of image blocks, calculating an arithmetic mean of gray values of pixels in each image block as the color features of the image block, calculating a ratio of a black pixel amount to a total pixel amount in the image block as the shape features of the image block, and determining overall visual features of the exemplary image according to the color features and the shape features of the image blocks;

distributing image comparison tasks of the available images to the one or more calculating servers, such that the one or more calculating servers calculate similarities of the available images according to the visual features of the exemplary image and predetermined visual features of the available images, fetch image indexes of the available images from an index server, and returns the similarities and the image indexes of the available images;

gathering the similarities and the image indexes of all the available images from the one or more calculating servers;

transferring the gathered similarities of the available images to a sorting server, and causing the sorting server to sort the available images according to the gathered similarities of the available images; and receiving a sorting sequence of the available images from the sorting server, and outputting the image indexes of the available images in the sorting sequence to a client computer.

5. The image retrieval method of claim 4, wherein the image comparison tasks are equally allocated.

6. The image retrieval method of claim 4, wherein a specified amount of the image indexes of the available images is outputted in the outputting process.

7. A non-transitory computer storage medium having stored thereon computer instructions that, when executed by a computerized device, cause the computerized device to execute an image retrieval method for searching images similar to an exemplary image from available images, the image retrieval method comprising:

extracting visual features of the exemplary image and transferring the visual features of the exemplary image to one or more calculating servers, wherein the visual features of the exemplary image comprise color features and shape features, and wherein the extracting step comprises steps of dividing the exemplary image into a plurality of image blocks, calculating an arithmetic mean of gray values of pixels in each image block as the color features of the image block, calculating a ratio of a black pixel amount to a total pixel amount in the image block as the shape features of the image block, and determining overall visual features of the exemplary image according to the color features and the shape features of the image blocks;

distributing image comparison tasks of the available images to the one or more calculating servers, such that the one or more calculating servers calculate similarities of the available images according to the visual features of the exemplary image and predetermined visual features of the available images, fetch image indexes of the available images from an index server, and return the similarities and the image indexes of the available images;

gathering the similarities and the image indexes of all the available images from the one or more calculating servers;

transferring the gathered similarities of the available images to a sorting server, and causing the sorting server to sort the available images according to the gathered similarities of the available images; and receiving a sorting sequence of the available images from the sorting server, and outputting the image indexes of the available images in the sorting sequence to a client computer.

8. The storage medium of claim 7, wherein the image comparison tasks are equally allocated.

9. The storage medium of claim 7, wherein a specified amount of the image indexes of the available images is outputted in the outputting process of the image retrieval method.

* * * * *